Feb. 18, 1964   P. B. ZEIGLER ETAL   3,121,345
STEERING MECHANISM
Filed Sept. 21, 1959   5 Sheets-Sheet 1
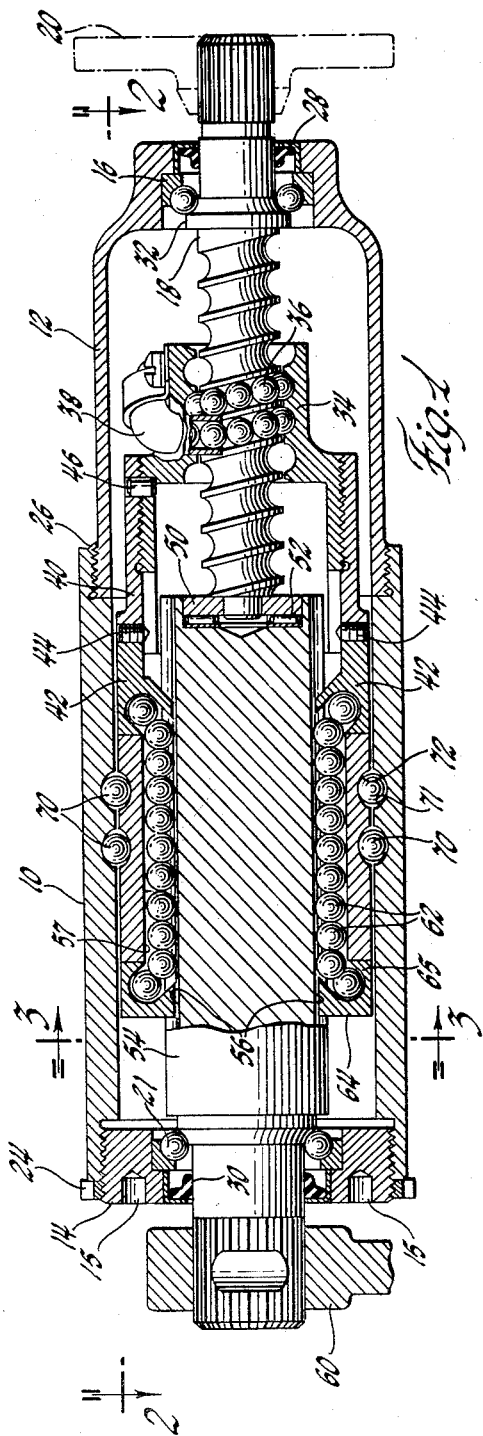
INVENTORS
Philip B. Zeigler &
BY William H. Doerfner
Bryce Beecher
ATTORNEY

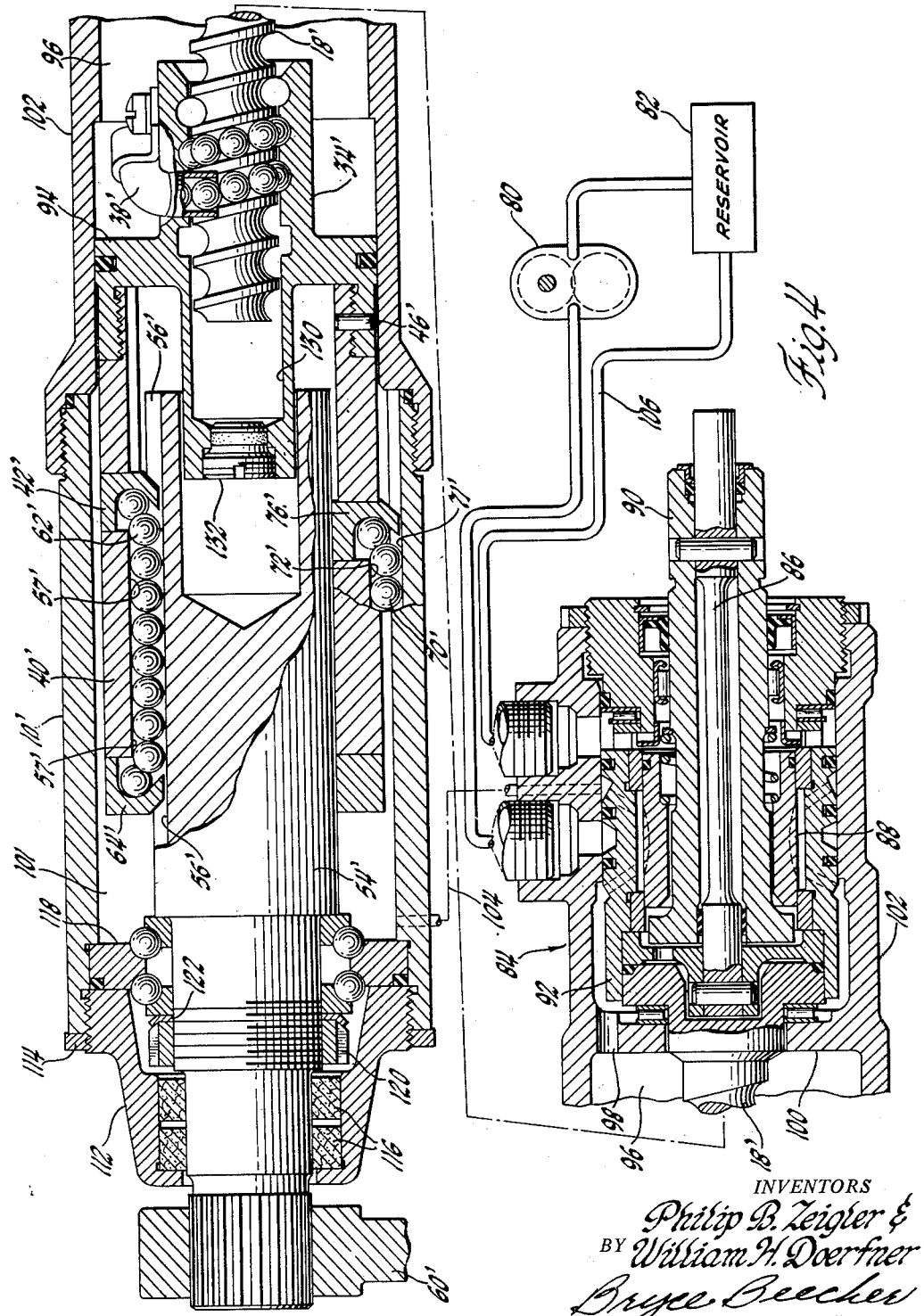

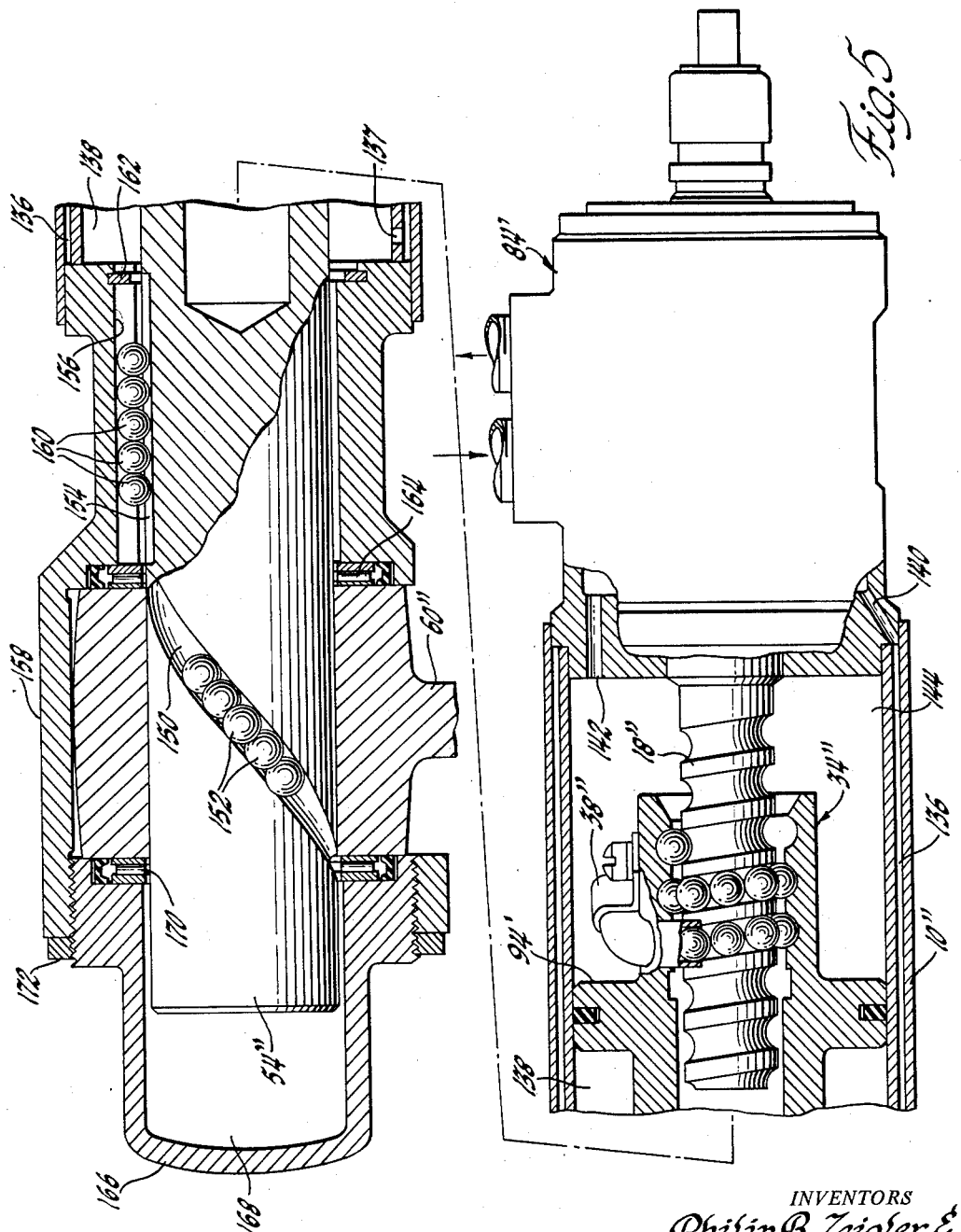

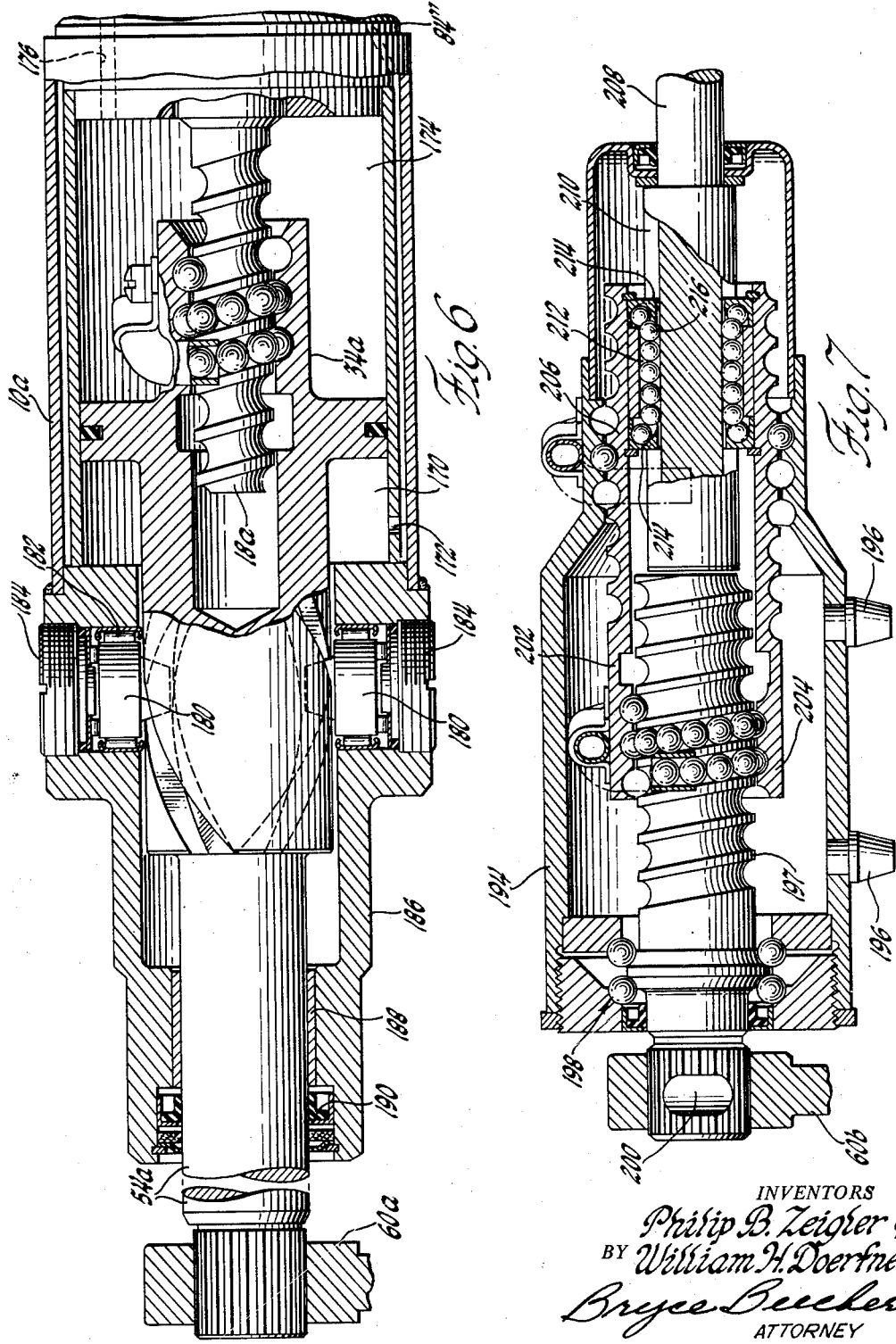

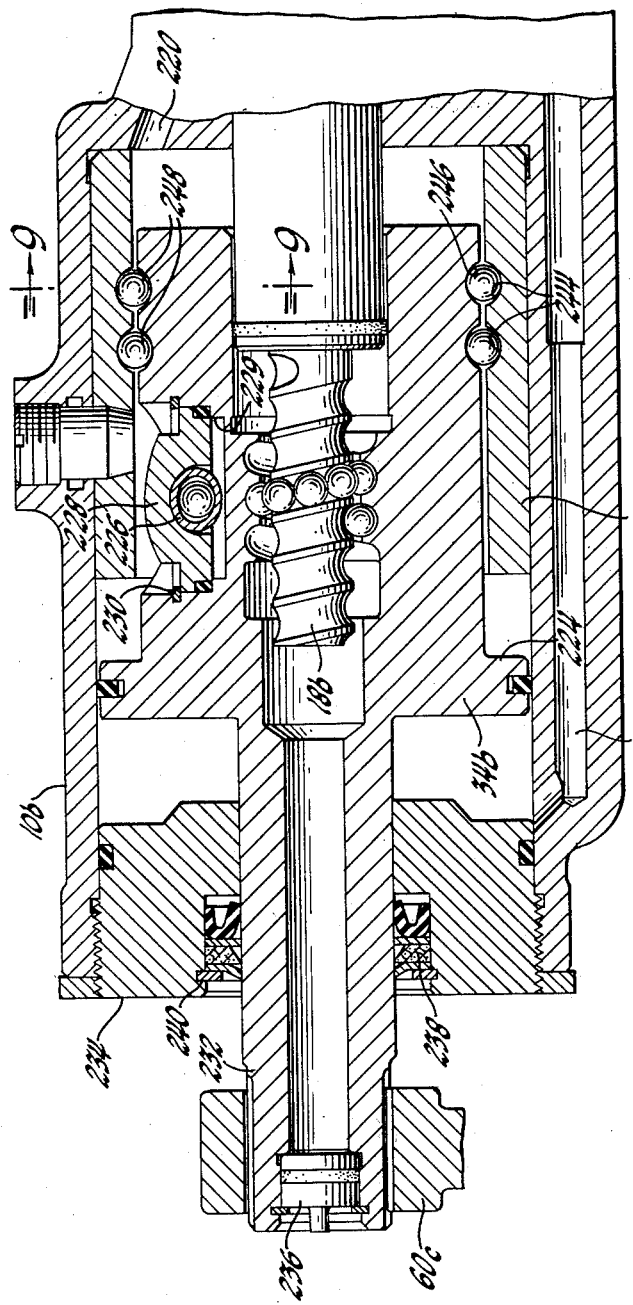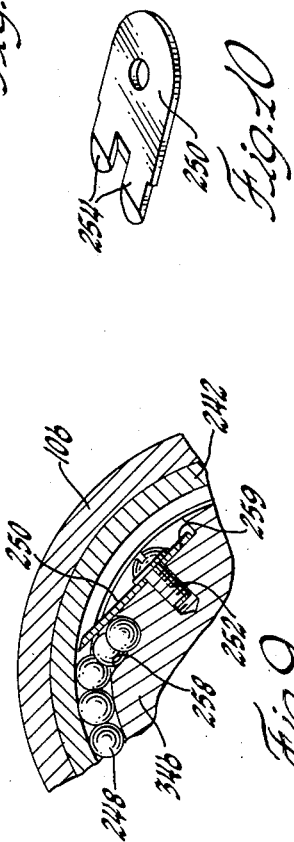

United States Patent Office 3,121,345
Patented Feb. 18, 1964

3,121,345
STEERING MECHANISM
Philip B. Zeigler and William H. Doerfner, Saginaw, Mich., assignors to General Motors Corporation, Detroit, Mich., a corporation of Delaware
Filed Sept. 21, 1959, Ser. No. 841,398
13 Claims. (Cl. 74—499)

This invention relates to reduction gearing and more particularly concerns a steering gear adapted for use either in manual or power steering.

A principal object of the invention is to provide a steering gear having high efficiency and good reversibility characteristics.

Another object is to provide a steering gear which requires less space in the vehicle, especially in the radial direction.

Other objects and features of the invention will be apparent from the following description and the accompanying drawings illustrating various embodiments of the invention. In the drawings:

FIGURE 1 is a longitudinal sectional view of a manual steering gear;

FIGURE 2 is a fragmentary view on the line 2—2 in FIGURE 1;

FIGURE 3 is a section on the line 3—3 in FIGURE 1;

FIGURE 4 is a broken longitudinal sectional view of a power steering gear conforming to the invention, certain auxiliary parts being shown diagrammatically;

FIGURE 5 is a broken longitudinal sectional view illustrating a second form of power steering gear according with the invention;

FIGURE 6 is a longitudinal sectional view illustrative of another manual gear;

FIGURE 7 is a longitudinal sectional view showing still another form of manual gear;

FIGURE 8 is a longitudinal sectional view illustrating a third form of power steering gear;

FIGURE 9 is a fragmentary section taken on line 9—9 of FIGURE 8; and

FIGURE 10 is a detail of a part shown in FIGURE 9.

In general, a gear conforming to the invention is characterized by the provision between a rotary input and an output member of a lineally moving component and means whereby the lineal movement of such component is translated into rotary movement at the output member.

Referring first to FIGURE 1, the numeral 10 denotes a cylinder threadingly connected at its opposite ends to bearing support members 12 and 14. Bearing 16 serves a worm shaft 18 adapted for connection externally of the member 12 to a steering shaft, not shown. The particular design contemplates the latter connection as made through a flexible coupling, a component 20 of which is shown in phantom lines.

Member 14 locates a bearing 21 and is secured against loosening by a lock ring 24. Holes 15 are complementary with respect to a tool used to apply member 14. A stake 26 is employed to make secure the threaded connection between cylinder 10 and the bearing support member 12. Outward of each of the bearings 16, 21 is a seal 28, 30, respectively, these being shown as of conventional design.

Reverting to the worm 18, the same will be seen as flanged at 32 to provide the inner race for the ball bearing 16. The worm mounts a nut 34 having an internal helical groove complementary to the worm groove, the connection between the two parts being effected through a train of balls 36 recirculated by means of a return tube 38 in a manner well understood in the art. Nut 34 is threadingly connected to a sleeve element 40 apertured for the reception of ball-recirculating devices 42, which are connected to the sleeve element via locating set screws 44 accommodated in tapped holes each of which is formed half in the sleeve element and half in the ball-recirculating device. Stake 46 makes secure the threaded connection between the nut 34 and the sleeve element 40.

The inner end of the worm 18 is formed to journal a thrust ring 50 abutting a needle bearing 52 accommodated with the thrust ring in a recess formed in a shaft 54 with respect to which the previously mentioned bearing 21 is functional. Shaft 54 has splined and keyed thereto outward of the cylinder 10 a pitman arm 60 which in application of the gear is operably connected to the steering linkage, not shown.

A plurality of axial grooves 56 formed in the shaft 54 find their complement in a like number of grooves 57 formed internally in the sleeve 40, the two sets of grooves providing passages for the balls 62 through which the sleeve 40 and shaft 54 are operably connected. The ball-recirculating devices 42 serve in operation of the gear to transfer the balls 62 between the straight passages.

An annular member 64 at the left end of the sleeve 40 has portions 65 operating to effect the transfer of balls 62 at such end of the sleeve. Such member is secured to the sleeve 40 via screws 66 seen in FIGURES 2 and 3. At 67 in FIG. 3 are indicated dowels serving in the location of the member 64 and in the prevention of radial lash between this member and the sleeve 40.

Shown integral with member 64 are ball-recirculating fixtures 68 serving balls 70 connecting sleeve 40 to the cylinder 10 which is provided with helical grooves 71 complementary to helical grooves 72 formed in the external cylindrical wall of the sleeve (FIGURE 2). Ball-recirculating fixtures 76, fastened to the sleeve 40, make endless the ball courses set by the helical grooves 71, 72 and the fixtures 68. Fixtures 68 and 76 will be understood as accommodated in the helical grooves 71. Two helical courses 71, 72, are comprised in the assembly, the same being diametrically opposed.

With the structure of the gear as described and illustrated, it should be apparent that on rotation of the worm 18, nut 34, and with it sleeve 40 and member 64, is caused to travel linearly or axially on the worm. This axial movement of the identified parts is accompanied by angular or rotary movement thereof induced by the helical connection involving the balls 70. As a consequence, shaft 54 due to the ball spline connection between it and sleeve 40 is caused to rotate or rock pitman arm 60 in the direction corresponding to the direction of rotation of the worm 18.

Particular mention should be made of the fact that the ball spline connection 62 between the sleeve 40 and the shaft 54 enables axial movement of the sleeve without axial movement of the shaft, which partakes only of the angular movement of the sleeve.

Going now to FIGURE 4, there will be seen a gear similar to that just described except for the association therewith of hydraulic power means. Thus, there is shown a pump 80 drawing from a reservoir 82. The flow from the pump 80 is illustrated as under the control of a rotary valve 84 incorporating a torsion bar 86 tending to maintain the working parts of the valve in centered relation. The particular valve will be found described in detail in co-pending application Serial No. 762,153 filed September 19, 1958, in the names of Philip B. Zeigler and William B. Thompson. In view of such disclosure, it is deemed unnecessary to describe the valve herein with any particularity. Suffice it to say that the angular displacement of the inner sleeve element 88 which is operably connected to the steering shaft (not shown) through the stub shaft 90, brings about the creation of a pressure differential across the piston 94 giving the power assist.

This angular movement is relative with respect to the outer sleeve member 92 which, like the torsion rod 86, is connected to the worm 18'.

Communication between the valve 84 and the chamber 96 to the right of the piston 94 is provided by a passage 98 formed in the web portion 100 of the valve housing 102. Communication between the chamber 101 at the left of the piston 94 is provided by a conduit 104 extending between such chamber and the valve. It will be understood, of course, that when either of the chambers 96, 101 is pressurized, i.e. opened to the pump 80 through the valve 84, the other chamber will exhaust to the reservoir 82 through the valve via conduit 106.

The steering gear under discussion comprises a cylinder 10' threadingly connected to the valve housing 102 and to a closure element 112 located at the end of the cylinder opposite the housing 102 and secured against loosening by a lock ring 114. Element 112 is formed for the accommodation of a pair of seals 116 and locates the outer race component of a ball bearing assembly 118. A nut 120 having a lock washer 122 associated therewith preloads the ball bearing assembly 118. Such nut is threaded on a shaft 54' corresponding to shaft 54 in FIGURE 1. Thus, the shaft 54' is operably connected externally of the cylinder 10' to pitman arm 60' and has formed therein a plurality of grooves 56' which with grooves 57' in the sleeve 40' provide lineal passages for the balls 62', these passages being made endless by recirculating devices 42' and 64'. Sleeve 40' is threadingly connected to the previously mentioned piston 94, the connection being made secure by a stake 46'. As shown, piston 94 is integral with ball nut 34'. Also integral with the ball nut is a guide portion 130 carrying a sealing plug 132.

Sleeve 40' in addition to the lineal or axial grooves 57' has therein helical grooves 72' corresponding to helical grooves 72, these helical grooves 72' forming with helical grooves 71' in the internal wall of the cylinder 10' passages for balls 70', such passages being made endless by recirculating devices 76' and similar means integrated with member 64' (see FIG. 2).

It should be apparent that the gear illustrated by FIGURE 4 operates just as the gear shown in FIGURE 1 except for the hydraulic power assist. Thus, as previously indicated, rotation of the stub shaft 90, in addition to causing rotation of the worm 18', displaces the inner sleeve component 88 of valve 84 with the result that pressure fluid is admitted to the proper side of the piston 94, which would be chamber 96 in the instance of a right turn, for example. The rotation of the screw 18' and the fluid pressure brings about axial and angular displacement of the assembly including the sleeve 40' and rocking of the pitman arm 60' through the shaft 54'.

In the manufacture of the gear just described, it is important that the effective reaction areas of the piston 94 be substantially identical, which is true in the case of the particular gear shown.

FIGURE 5 illustrates a modified form of power gear which is substantially different in point of the method of inducing rocking of the pitman arm 60". Such gear incorporates a valve 84' which may be identical with the valve 84, reference again being made to co-pending application Serial No. 762,153. The gear further comprises a double-walled cylinder 10", the annular space 136 between the two tubular sections being used with ports 137 and 140 as a passage between the valve 84' and the chamber 138 at the left of the piston 94'. A second port 142 communicates the valve with the chamber 144 at the right of the piston 94'.

Piston 94' is part of an integral structure including a ball nut portion 34" and a shaft portion 54" having helical grooves 150 therein. These grooves 150 (only one shown) find their complement in similar grooves formed in the head of the pitman arm 60" so that helical passages for balls 152 are provided. In this instance, no provision is made for recirculation of the balls.

In addition to the helical groove 150, shaft portion 54" is provided with axial grooves 154 which, with axial grooves 156 formed in the internal wall of the housing 158, supply passages for non-recirculating balls 160. A snap ring 162 operates as a ball retainer. Needle bearing 164 serves a similar function.

Housing 158 will be seen as closed by a cap piece 166 formed to provide a space 168. This cap piece locates the thrust bearings 170 for the pitman arm 60" and carries a lock ring 172 making secure its threaded connection with housing 158.

In the operation of the gear of FIGURE 5, the axial movement of the shaft portion 54" induced by rotation of the worm 18" and the pressure fluid supplied through the valve 84' is accompanied by angular movement of pitman arm 60" induced by the helical ball connection 152 between such arm and the shaft portion 54". As should be apparent, the previously mentioned space 168 is provided for accommodation of the shaft portion 54" as it moves linearly leftwardly.

The gear of FIGURE 6, which will now be described, also utilizes the rotary power steering valve shown in FIGURE 4, the same being denoted by the numeral 84". Fluid flow to and from chamber 170 follows the annular space between the two sections of the double-walled cylinder 10a, such space communicating with the chamber via a port 172. Chamber 174 to the right of the ball nut piston 34a communicates with the valve via a port 176—equivalent to port 98 in FIGURE 4.

The shaft extension 54a of the ball nut piston 34a will be seen as having therein a pair of helical grooves in each of which is accommodated the tapered portion of a roller 180 turning in bearings 182 and located by a plug 184. Splined to the shaft portion 54a at its end outward of the housing 186 is a pitman arm 60a. The shaft portion 54a moves axially and rotates within a bushing 188 located just inward of the seal structure 190. It is believed apparent that the rotary movement is induced by the helical connection between the shaft and the housing 186 which, of course, is held stationary.

The construction of FIGURE 6 distinguishes over the previously described constructions in that the pitman arm 60a moves axially with the shaft portion 54a. This axial movement is readily compensated for at the point of connection of the pitman arm and the steering linkage system.

The modification of FIGURE 7, next up for discussion, is a manual gear, i.e., no power assist is contemplated. Here, the gear housing 194 is shown provided with a pair of mounting lugs 196. A worm 197 within the housing 194 turns in a ball bearing 198 and is shown connected externally of the housing by splining and keying (200) to a pitman arm 60b. A sleeve element 202 has a ball nut connection 204 with the worm 197 and a second ball nut connection 206 with the housing 194. Extending into the sleeve element at its end opposite the worm 197 is a steering shaft member 208 having axial grooves 210 which, with axial grooves 212 formed in the inner wall of the sleeve element 202 and recirculating devices 214, provide endless passages for balls 216. The recirculating devices 214 are secured to the sleeve element to move therewith, shaft 208 being restrained against axial movement.

In operation of the gear (FIG. 7), rotation of the shaft 208 causes rotation of the sleeve element 202, this by reason of the ball connection between such parts. Due to the ball nut connection 206, this rotary movement is accompanied by axial displacement of the sleeve element, such axial displacement being translated into rotary movement of the screw 197 by virtue of the ball nut connection 204. Thus, the pitman arm 60b is rocked as desired.

Going now to FIGURE 8, showing a fourth power gear, there will be seen a ball nut piston 34b housed within a cylinder 10b having drilled passages 220 and 222 serving in the conveyance of fluid between the power steering valve, not shown, and the two chambers delineated by the piston portion 224. The ball nut piston incorporates the usual return tube 226 which is secured by a locator 228 accommodated in a recess 229 in the ball nut piston. A snap ring 230 seating in an annular groove formed in the recess holds the part 228 in place.

The ball nut piston 34b has an integral shaft portion 232 which extends through a closure plug 234 for connection with the usual pitman arm 60c. Leakage through the portion 232 is prevented by a seal plug 236, while leakage about such portion is prevented by a seal 238 received in a recess formed in the closure plug 234 and retained by a snap ring 240.

Surrounding the ball nut piston 34b within the cylinder 10b and staked to the cylinder is a sleeve member 242 having in the internal wall thereof helical grooves 244 complementary to the helical grooves 246 in the ball nut piston (see FIGURE 9). Recirculation of the balls 248 in the helical grooves is provided for by short arcuate sub-grooves 258 in the ball nut piston. As shown in FIGURE 9, these sub-grooves 258 are disposed adjacent flats 259 formed on the ball nut piston, each of such flats being overlaid by a fixture 250 having deflector fingers 254 extending into the ball passages interconnected by the sub-groove. The fixtures 250 are shown secured by screws 252.

In the operation of the construction of FIGURE 8, the axial movement of the ball nut piston 34b induced by the turning of the worm 18b and the pressure of the fluid applied against the ball nut piston causes axial movement of the pitman arm 60c just as in the case of the gear illustrated by FIGURE 6. But such movement of the pitman arm, as before explained, is readily compensated for at the point of connection of the arm and the steering linkage. As the pitman arm moves axially it, of course, rotates or rocks by force of the helical ball connection between the ball nut piston and the sleeve member 242.

Each of the embodiments which have been disclosed have in common the utilization of rolling balls as opposed to gear teeth. It is this feature which accounts for the high efficiency and superior reversibility of the gears as compared to conventional steering gears. Apart from the functional advantages, the coaxialarity of the parts allows for installation in vehicle engine compartments so crowded with accessories as to preclude the use of a conventional steering gear and makes for economies in shipment and storage.

We claim:

1. An actuator comprising a rotary input member, an output member, an intermediate member and a casing within which said intermediate member is housed, said intermediate member having a helical ball connection with said casing and with said input member and a straight ball spline connection with said output member, said actuator being characterized in operation in that on rotation of said input member said intermediate member is caused to move lineally while being rotated by force of said helical ball connection with said casing and in that the rotary motion of said intermediate member is imparted to said output member through said ball spline connection.

2. An actuator comprising a rotary input member, an output member supported for rotary movement, an intermediate member and a casing within which said intermediate member is housed, said intermediate member having a helical recirculating ball connection with said casing and with said input member and a straight recirculating ball spline connection with said output member, said output member being restrained against lineal movement, the splines carried thereby being of greater length than the complementary splines carried by said intermediate member.

3. A steering gear comprising within a casing a rotary input member, an output member supported for rotary movement and an intermediate member, the latter having a helical recirculating ball connection with said casing and with said input member and a straight recirculating ball spline connection with said output member, said output member being restrained against lineal movement and mounting a pitman arm externally of said casing, the splines carried thereby being of greater length than the complementary splines carried by said intermediate member.

4. A steering gear comprising an elongated, generally cylindrical casing, a worm extending into said casing at one end thereof, a shaft accommodated within said casing and having a portion extending from the other end thereof, said shaft being in concentric alignment with said worm and providing a bearing for the inner end of the worm, a pitman arm secured to the extended portion of said shaft, and a sleeve member within said casing in enveloping relation to said shaft, said sleeve member having a helical recirculating ball connection with said worm and with said casing and a straight recirculating ball spline connection with said shaft, the splines carried by said shaft being of greater length than the complementary splines carried by said sleeve.

5. A power steering gear comprising a rotary input member, an output member, a piston component and a casing within which said piston component is housed, said casing having a pair of longitudinally spaced ports with the piston component disposed therebetween, said piston component having a helical ball connection with said casing and with said input member, and a straight ball spline connection with said output member.

6. A power steering gear comprising an elongated, generally cylindrical casing, a worm extending into said casing at one end thereof, a shaft accommodated within said casing and having a portion extending from the other end thereof, said shaft being in concentric alignment with said worm, a pitman arm secured to the extended portion of said shaft and a piston component within said casing in enveloping relation to said shaft, said piston component having a helical recirculating ball connection with said worm and with said casing and a straight recirculating ball spline connection with said shaft, the splines carried by said shaft being of greater length than the complementary splines carried by said piston component.

7. A steering gear comprising a rotary input member, an output member, a third member operably connected to said input member so as to move lineally on rotation of said input member, and a helical ball connection between said third member and said output member whereby the lineal movement of said third member is translated into rotary movement of said output member.

8. A steering gear comprising a housing, a rotary input member, an output member, a shaft within said housing carrying a piston, said shaft being operably connected to said input member so as to move lineally on rotation of said input member, means for introducing pressure fluid into said housing at either side of said piston and a helical ball connection between said shaft and said output member whereby the lineal movement of said shaft is translated into rotary movement of said output member.

9. A steering gear conforming to claim 8 wherein the connection between said shaft and said input member is a helical ball connection.

10. A steering gear comprising a housing, a rotary input member, an output member, a third member operably connected to said input member so as to move lineally on rotation of said input member, said third member having a helical groove therein, and a roller supported by said housing and having a portion accommodated in said helical groove whereby the lineal movement of said third member proceeds with rotary movement thereof, said third member being connected externally of said housing to said output member.

11. A steering gear conforming to claim 10 wherein said third member has a piston portion and means are provided for introducing pressure fluid into said housing at either side of said piston portion.

12. A steering gear comprising a housing, a rotary input member extending into said housing, a worm within said housing having a portion extending therefrom, a pitman arm secured to the extended portion of said worm and a sleeve member having a ball spline connection with said rotary input member, a helical ball connection with said housing, and a helical ball connection with said worm.

13. A steering gear comprising a housing, a ball nut piston within said housing having a portion extending therefrom, a pitman arm secured to such extended portion, a worm extending into said housing for operable connection to said ball nut piston, a sleeve secured to the inner wall of said housing and enveloping said ball nut piston and a helical ball connection between said ball nut piston and said sleeve.

References Cited in the file of this patent

UNITED STATES PATENTS

| | | |
|---|---|---|
| 2,266,923 | Trbojevich | Dec. 23, 1941 |
| 2,490,449 | Lynch | Dec. 6, 1949 |
| 2,648,994 | Doerfner et al. | Aug. 18, 1953 |
| 2,742,021 | Geyer | Apr. 17, 1956 |
| 2,791,894 | Duckworth | May 14, 1957 |
| 2,890,594 | Galonska | June 16, 1959 |
| 2,897,684 | Lincoln et al. | Aug. 4, 1959 |
| 2,908,152 | Anderson | Oct. 13, 1959 |